March 19, 1935.  S. DE ORLOW  1,994,984
VEHICLE JACKING STRUCTURE
Filed Nov. 15, 1934   2 Sheets-Sheet 1
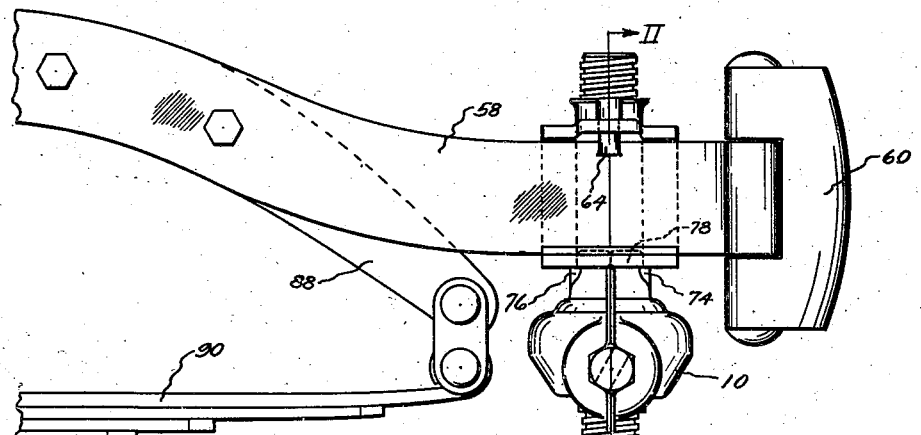
Fig.1
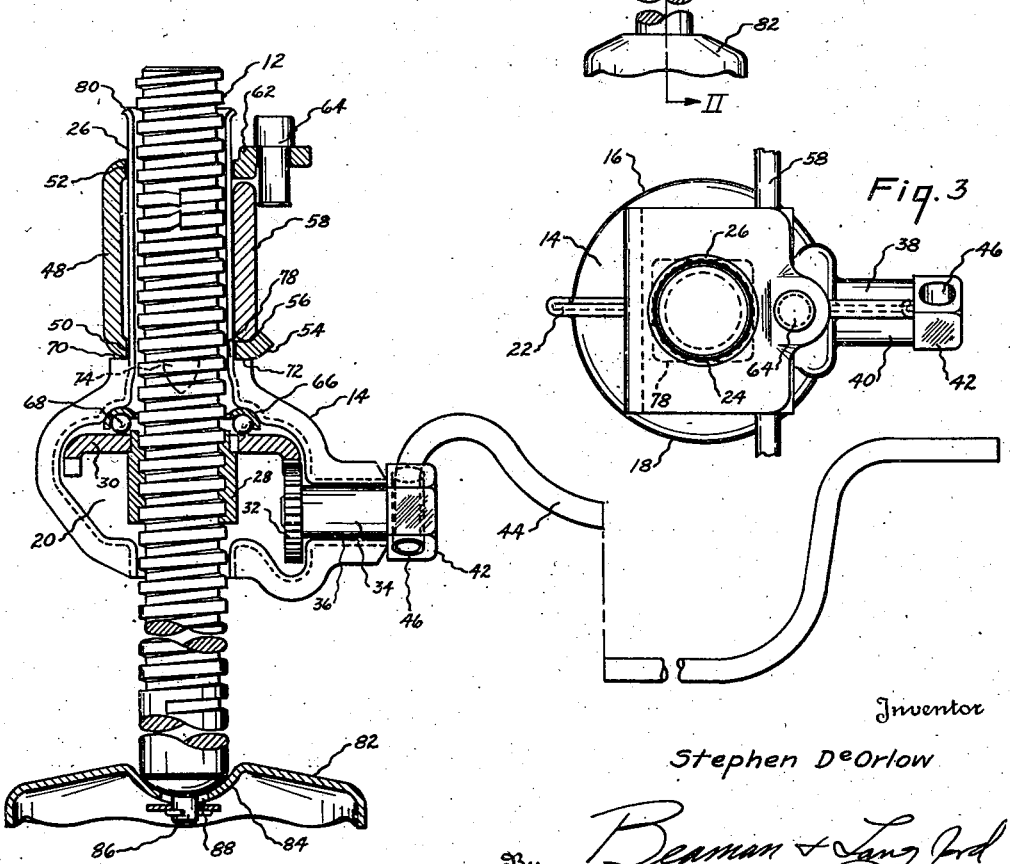
Fig.2
Fig.3
Inventor
Stephen De Orlow
By Beaman & Langford
Attorney March 19, 1935.  S. DE ORLOW  1,994,984
VEHICLE JACKING STRUCTURE
Filed Nov. 15, 1934   2 Sheets-Sheet 2

Inventor
Stephen DeOrlow

Patented Mar. 19, 1935

1,994,984

UNITED STATES PATENT OFFICE 1,994,984

VEHICLE JACKING STRUCTURE

Stephen De Orlow, Detroit, Mich., assignor to Ryerson & Haynes, Inc., Jackson, Mich., a corporation of Michigan Application November 15, 1934, Serial No. 753,153

11 Claims. (Cl. 254—133)

The present invention relates to improvements in jack structures having particular reference to a jack structure for automotive vehicles. As a result of present day design of the body and chassis of automotive vehicles to effect streamlining and low center of gravity, it has become almost impossible to apply a standard jack under the axle or axle housing for the purpose of elevating a running wheel.

Heretofore there have been innumerable attempts made and structures proposed obviating the necessity of locating the jack beneath the axle. It has been proposed to support the unsprung structure of the vehicle from the sprung structure in order that elevation of a wheel or wheels may be effected by the application of a jack to the sprung structure. It has also been proposed to apply brackets or fixtures to various parts of the sprung structure of the vehicle, for example at the point of attachment of the spring shackles, in order that a jack might be applied at some point other than beneath the axle. Also extensions have been proposed for the conventional jack in order that it may be applied against some point of the vehicle structure located at a distance considerably greater from the ground than the axle or axle housing. However, each of these enumerated proposals have necessitated the provision of special means for supporting the unsprung structure from the sprung structure or special attachment features which are permanently attached to the vehicle or comprise an attempt to modify the conventional jack to adapt it to a point of application for which it was never intended or designed. Up to the present time none of the foregoing proposals have met with commercial acceptance, and although it is practically impossible to insert the conventional jack under the axle of a vehicle of present day design, in the event it becomes necessary to change a wheel or tire upon the road, such jack structure is still offered as part of the standard equipment of the tool kit for the want of a more satisfactory structure.

It becomes the object of the present invention to provide a jack structure which is specifically designed to be applied to a sprung part of a vehicle structure which is easily accessible and to which the jack may be readily applied without any special provisions being made for the application. In its preferred form the jack is designed to be applied to a portion of the bumper structure and preferably to the mounting bar. The jack structure is provided with a bracket which may be readily and detachably applied to the bumper structure and comprises a simple screw of sufficient length to elevate the unsprung wheel structure through suspension from the sprung structure without the employment of any auxiliary supporting means. With the screw in a retracted position the operator needs only to hang the jack upon a part of the bumper structure and the screw is operated downwardly until the base of the jack encounters the ground and sufficient lifting action is imparted to the bumper to elevate the desired part of the unsprung wheel structure. As will be fully set forth in the detailed description to follow, the design of the jack structure is such as to obviate any possible damage to the vehicle or jack structure that might result from an attempt to elevate the running wheel without the brakes being applied.

Other objects and advantages of the invention residing in the combination, arrangement and construction of parts will become apparent from the following description. The invention is clearly set forth in the appending claims.

In the accompanying drawings in which a single embodiment is shown for the purpose of illustration.

Fig. 1 is a side elevational view of a portion of a vehicle chassis structure showing the jack applied to the mounting bar of the bumper, Fig. 2 is a vertical cross sectional view taken of the jack and bumper bar structure taken on line II—II of Fig. 1.

Fig. 3 is a plan of the jack structure as shown in Fig. 1.

Figure 4:
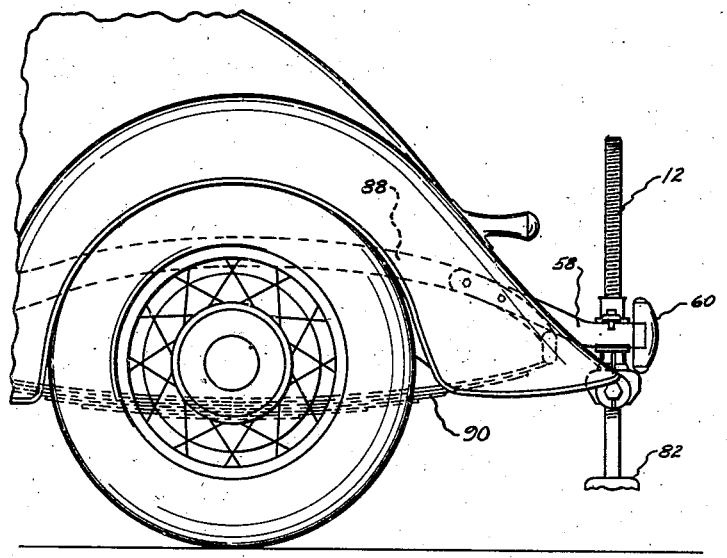
Fig. 4 is a side elevational view of the jack applied to the bumper structure of a vehicle which is illustrated as having deep skirted fenders partially confining the wheel.

Referring to the drawings my improved jack structure 10 consists of a threaded thrust bar 12 of considerable length. In practice it has been been found necessary that the bar be approximately 24" in length and be threaded at least throughout a distance of 14" to 18" as it is found that it is necessary to impart a lift of this magnitude to the sprung structure of the vehicle in order to suspend from the ground the unsprung wheel structure. It has also been found that considerable more elevation is required in the case of elliptical and semielliptical springs than in the case of individually sprung wheels of recent adoption. As the length of the threaded thrust bar 12 is approximately twice the length of the screw of the conventional jack it is readily apparent that with the thrust bar in its retracted position it can be only applied to a part of the vehicle structure affording ample head room. It is for this reason that the jack has been especially designed and constructed to be applied to the bumper structure which is conventionally forward and rearward of any horizontally projecting part of the vehicle body or chassis.

The actuating structure for the thrust bar 12 comprises a housing 14 fabricated from complementary sheet metal halves 16 and 18 having portions defining an enlarged chamber 20 which portions are flanged and crimped upon one another as at 22 to secure the halves together. Integral with the portions defining the chamber 20 of the housing 14 are elongated semicircular portions 24 and 26 defining a cylindrical housing and guide for the upper part of the thrust bar 12. Located within the chamber 20 is a nut 28 which is received upon the threaded portion of the thrust bar 12 and which has associated therewith and secured against relative movement a sheet metal gear 30 which meshes with the pinion 32 carried by a shaft 34 journaled in a bearing 36 integral with and defined by portions 38 and 40 of the sheet metal halves 16 and 18. The shaft 34 is shown as provided with a hexagon nut 42 which may be rotated by the same wrench employed to remove the nuts to demount the wheel or it may be rotated by a suitable crank 44 received in the aperture 46 defined in the nut 42.

A U-shaped sheet metal bracket 48 is shown apertured at 50 and 52 to be received upon the cylindrical housing defined by the portions 24 and 26. The design of the bracket 48 when the jack structure is to be applied to the mounting bar consists of a lower seat portion 54 which may be slightly channeled at 56 to confine the lower edge of the mounting bar 58 of the bumper structure from which the impact bar 60 is supported in a well known manner. The upper portion 62 preferably overhangs the mounting bar 58 when in position and carries a pin 64 which may be manually raised to permit the mounting bar to be received and then dropped to the position shown in Fig. 2 to confine the mounting bar 58 and to support the jack structure therefrom. By the provision of the bracket structure just described or an equivalent arrangement it is possible to readily support the jack structure from the mounting bar or other part of the bumper structure with the thrust bar 12 in a retracted position and to manipulate the shaft 34 without the necessity of manually holding or steadying the jack structure while the thrust bar is being directed downwardly and prior to the time lifting takes place. The thrust upon the nut 28 and its associated gear 30 is carried through the housing 14 by a sheet metal bearing cup 66 and galls 68 confined thereby and rolling upon the upper face of the gear 30. Through the housing 14 the thrust of the bar 12 is directed against the bracket 48 and the mounting bar 58 through shoulders 70 and 72 constituting flanged portions of the halves 16 and 18 and shoulders 74 and 76 lanced from the halves 16 and 18.

To permit angular adjustment of the housing 14 and shaft 34 with reference to the bracket 48 and yet prevent relative rotation between these parts at the time the thrust bar 12 is being actuated, a part of the housing 14 such as at 78 is squared between the cylindrical housing defined by the portions 24 and 26 and the part of the housing 14 defining the chamber 20. This part is received within the aperture 50 which is similarly squared. With the bracket in the position shown in Fig. 1 abutting the several shoulders, the squared portions of the bracket and the housing 14 will be in interlocking engagement with the result that the same are locked together as a unit against relative rotation about the axis of the thrust bar 12. However, if it is desired to change the angularity of the bracket with reference to the shaft 34 the bracket may be lifted from the position shown in Fig. 2 and rotated through 90°, for example, and the squared portions of the bracket and housing again brought into interlocking engagement. It will be noted from inspection of the drawings that the cylindrical housing defined by the portions 24 and 26 is of considerably greater extent than the bracket 48 which permits the bracket to be raised for angular adjustment; the upper cylindrical housing having the end flared at 80 to provide a flange retaining at all times the bracket 48 and housing 14 in assembled relation.

To compensate for irregularities in the ground to also provide against damage resulting to either the jack or vehicle structure in the event that an attempt is made to elevate a running wheel without the application of the brakes, the sheet metal base 82 of the jack is provided with a centrally located socket 84 in which is seated the lower end of the thrust bar 12 which may have a curvature corresponding to that of the socket 84 to give a ball and socket joint effect. In order to retain the base and thrust bar in assembled relation, in the embodiment illustrated, the bar is provided with a projection 86 which is loosely received within an aperture 88; suitable means such as a washer and cotter key may be employed to prevent removal of the projection 86 from the aperture 88 yet at the same time permitting the thrust bar and base to assume various angular positions in all directions with reference to each other.

It will be understood that the mounting bar 58 is suitably supported in a well known manner to the sprung portion of the vehicle chassis such as the frame member 88 and that the unsprung structure including the running wheel and axle is connected with and supports the sprung structure through the spring 90. When it is desired to jack up any one of the running wheels the jack 10 is applied to the mounting bar 58 structure which is usually in substantial alignment with one of the side frames of the chassis and the spring associated therewith. Upon the actuation of the thrust bar downwardly it should be apparent that through the bumper the frame 88, for example, will be lifted and after being elevated sufficiently the wheel on one side of the vehicle will be lifted and suspended through the spring 90 in the manner shown in Fig. 5. In a similar manner, in the case of transversely extending springs or individually sprung wheels, any one of the running wheels may be elevated by being suspended from the sprung structure.

Figure 5:
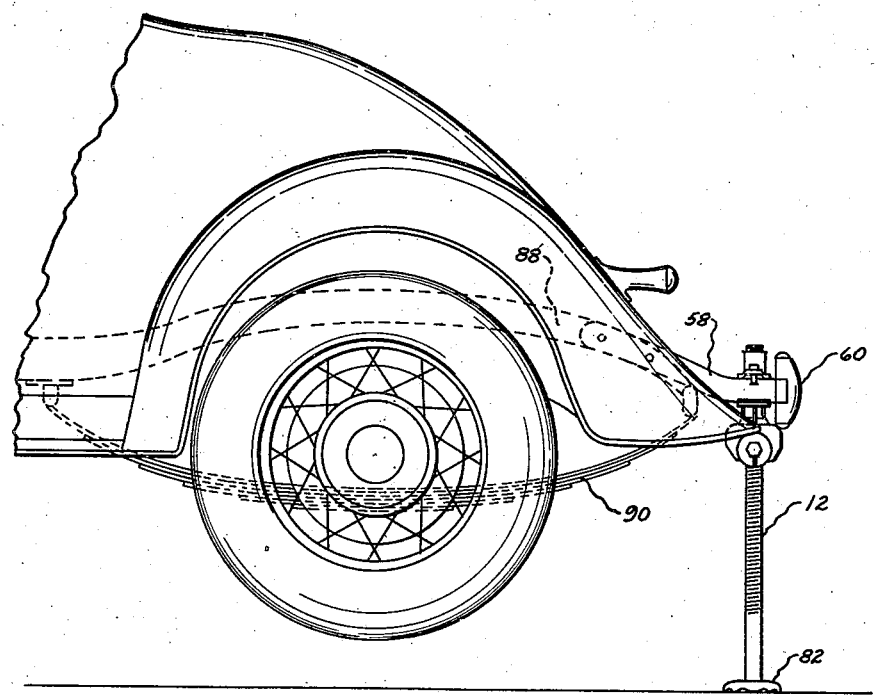
Fig. 5 is a view similar to Fig. 4 showing a running wheel of the vehicle suspended from the sprung structure and dropped from within the fender.

The jacking structure of the present invention has found particular application in the jacking up of vehicle wheels where the fender design is of the deep skirted type and the wheel is more or less confined by a portion of the fender skirt as shown in Fig. 4. By jacking up a running wheel in the manner heretofore stated it will become apparent that the unsprung structure will assume a position considerably lower with reference to the sprung structure upon its suspension therefrom with the result that the wheel is positioned clear of the fender and its removal facilitated as shown in Fig. 5. From this it will be seen that the present invention, aside from facilitating the jacking operation of a running wheel in a vehicle of modern design, makes it possible to carry out still further the tendency toward confining and shielding the running wheel within a skirted fender.

From the foregoing description it should become apparent to those skilled in the art that I have provided a simple, effective and inexpensive jack structure which for the most part may be entirely fabricated from sheet metal. The simplicity of the design of the jack is made possible by its point of application which obviates any necessity of resorting to telescoping screws and extensions which have been found necessary to permit the jack structure to be of a height enabling it to be inserted under the axle and yet have sufficient extension to elevate a running wheel to a proper height.

It is to be clearly understood that I fully anticipate the modification of the bracket herein shown for the attachment of the jack to be applied to parts of the bumper structure other than the mounting bar and even to other parts of the vehicle structure similarly disposed with reference to the body and chassis as the bumper structure.

Having described my invention what I claim as new and desire to cover by Letters Patent is:

1. In combination with a vehicle having a bar secured to a sprung part of the vehicle structure, a detachable lifting jack structure provided with supporting means to receive and hold upon said bar to elevate an associated portion of the vehicle through force exerted on said bar, said supporting means comprising a hook-shaped ledge for receiving the lower portion of said bar, and movable means for maintaining said bar on said ledge during lifting.

2. In combination with a vehicle having a bar secured to a sprung part of the vehicle structure, a detached lifting jack structure provided with supporting means to receive and hold upon said bar to elevate an associated portion of the vehicle through force exerted on said bar, said supporting means comprising a fixed channel part in which a portion of said bar is received and restrained against lateral movement, and movable means for engaging another portion of said bar to maintain said bar and jack structure in operative relation.

3. In combination with a vehicle having a relatively flat vertically disposed bar secured to a sprung part of the vehicle structure, a detached lifting jack structure provided with supporting means to receive said bar to elevate an associated portion of the vehicle through force directly exerted on said bar, said supporting means comprising a channel shaped part defining a seat in which the lower edge of said bar is received and restrained against lateral movement, and spaced shoulder portions for engagement with opposite sides of said bar to maintain said bar and jack structure in operative relation.

4. In combination with a vehicle having a bumper structure carried at an elevation, a detached lifting jack structure provided with supporting means to receive and hold upon the bumper structure to elevate an associated portion of the vehicle through force exerted upon said bumper, said supporting means comprising a receiving channel having a hook-shaped lower weight-supporting portion in which said bumper structure is adapted to be received, and means for engagement with an upper portion of said bumper structure for maintaining the same in said channel.

5. In combination with a vehicle having a bar secured to a sprung part of the vehicle structure, a detachable lifting jack structure provided with supporting means to receive and hold upon said bar to elevate an associated portion of the vehicle through force exerted on said bar, said supporting means comprising a receiving channel having a hook-shaped lower weight-supporting portion in which said bar structure is adapted to be carried, and means for engagement with the upper portion of said bar structure for maintaining the same in said channel.

6. In combination with a vehicle having the frame and axle supported in spaced relation through a spring and a bumper structure carried at an elevation, a detached jack structure comprising a housing, a threaded thrust bar received within and actuated through said housing, a bracket carried by said housing providing means offset from yet directly adjacent the path of said thrust bar to receive and hold upon the bumper structure, said bracket comprising a hook-shaped ledge for receiving the lower portion of said bumper structure and means for engaging the upper portion of said bumper structure for preventing displacement of said bumper portion from said ledge, means located within said housing for actuating said thrust bar downwardly, said bar being of sufficient length to elevate said bumper and frame to suspend the wheel carried by said axle through said spring.

7. In combination with a vehicle having the frame and axle supported in spaced relation through a spring and a bumper structure carried at an elevation, a detached jack structure comprising a housing, a threaded thrust bar received within and actuated through said housing, a bracket carried by said housing providing means offset from yet directly adjacent the path of said bar to receive and hold upon the bumper structure, said bracket comprising a receiving channel having a hook-shaped lower weight-supporting portion in which said bumper structure is received, and means engageable with the upper portion of said bumper structure for maintaining the same in said channel, means located within said housing for actuating said thrust bar downwardly, said bar being of sufficient length to elevate said bumper and frame to suspend the wheel carried by said axle through said spring, said bracket and housing being capable of angular adjustment about the axis of said bar relative to each other.

8. A detached vehicle jack structure comprising a housing, a threaded thrust bar extending through said housing having a supporting base upon the lower end, means within said housing for actuating said thrust bar, including a manually rotated shaft, load supporting means for engagement with a vehicle part carried by said housing, said last means and said shaft being capable of relative angular adjustment about the axis of said thrust bar, and means positively locking said last means and housing against angular adjustment with said last means in load supporting position.

9. In combination with a vehicle having a bumper structure carried at an elevation from a sprung part of the vehicle structure, a detached lifting jack structure provided with supporting means for direct application and engagement with a part of the bumper structure to elevate an unsprung part of the vehicle structure associated with said sprung part through force exerted upon said bumper, said means including a seat upon which a part of the bumper structure is freely supported and restrained against relative lateral movement, a thrust bar, mechanism for actuating said thrust bar downwardly for elevating the vehicle structure, and a housing for said mechanism with which said supporting means is associated as a unit.

10. In combination with a vehicle having a bumper structure including an impact bar and a mounting bar carried at an elevation from a sprung part of the vehicle structure, a detached lifting jack structure provided with supporting means for direct application and engagement with the mounting bar to elevate an unsprung part of the vehicle structure associated with said sprung part through force exerted upon said mounting bar, said means including a seat upon which the lower part of said mounting bar is freely supported and restrained against relative lateral movement, a thrust bar, mechanism for actuating said thrust bar downwardly for elevating the vehicle structure, and a housing for said mechanism with which said supporting means is associated as a unit.

11. In combination with a vehicle having the frame and axle supported in spaced relation through a spring and a structure extending outwardly from said frame and carried at an elevation, a detached jack designed to be carried within a compartment of the vehicle and to be readily applied to said structure, said jack being provided with supporting means for direct application and engagement with said structure, said means including a seat upon which a part of said structure is freely supported and restrained against relative lateral movement, a thrust bar, mechanism for actuating said thrust bar downwardly for elevating the vehicle structure, and a housing for said mechanism with which said supporting means is associated as a unit.

STEPHEN DE ORLOW.